Figure 1:
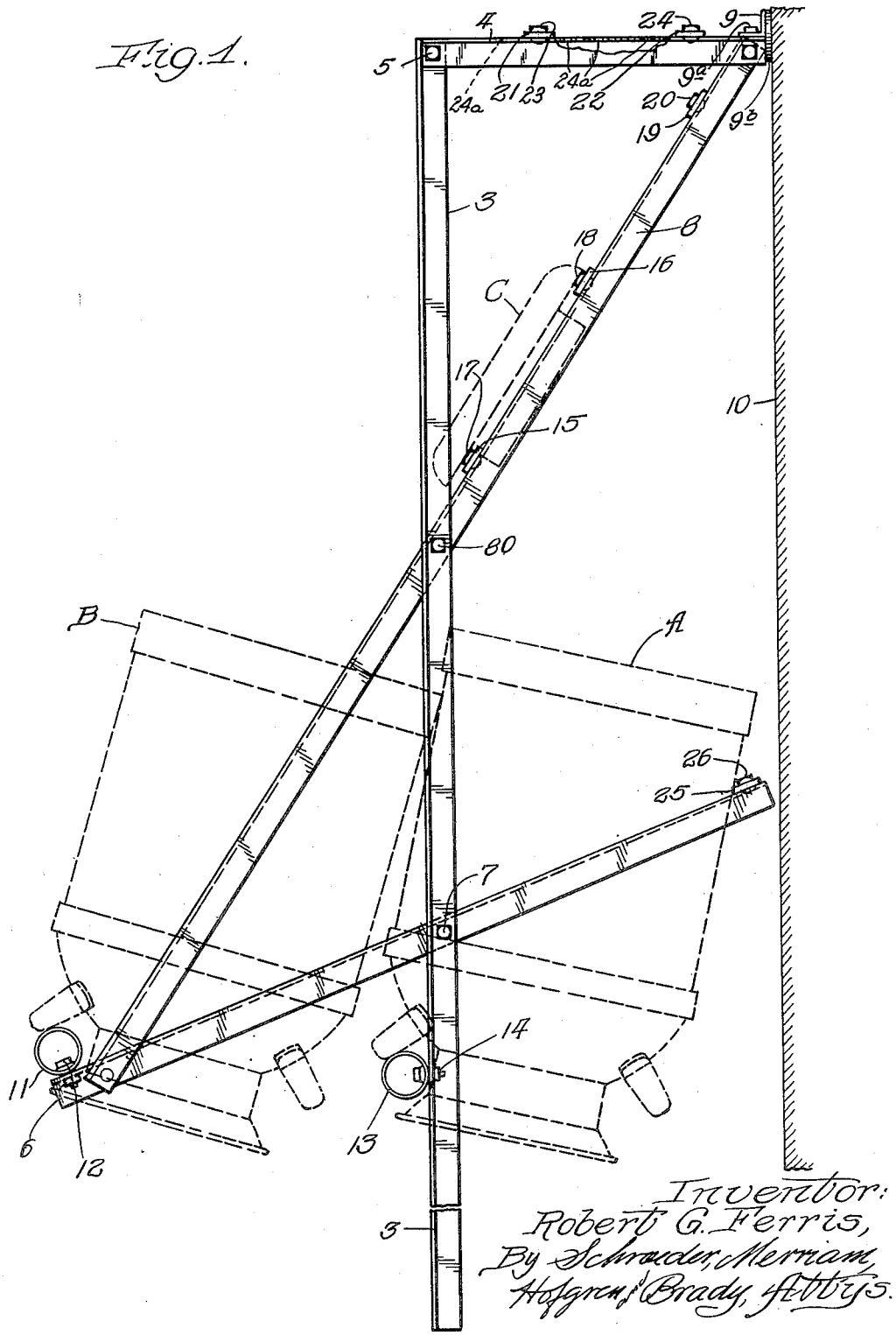

June 29, 1954 R. G. FERRIS 2,682,339
MILK CAN RACK
Filed April 12, 1951 2 Sheets-Sheet 1

Inventor:
Robert G. Ferris,
By Schrader, Merriam,
Hofgren & Brady, Attys.

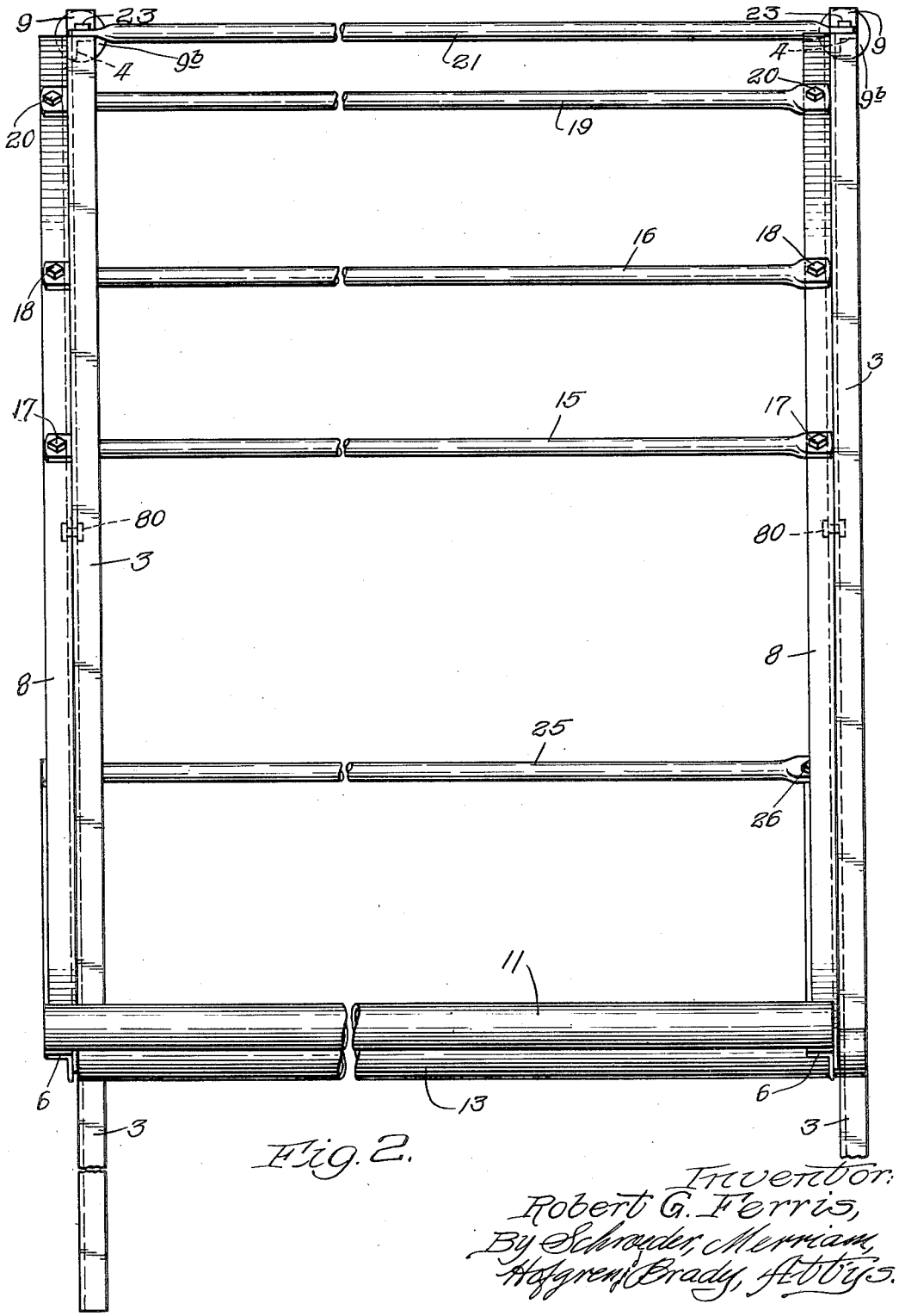

Patented June 29, 1954

2,682,339

UNITED STATES PATENT OFFICE 2,682,339

MILK CAN RACK

Robert G. Ferris, Harvard, Ill., assignor to Starline, Inc., a corporation of Illinois Application April 12, 1951, Serial No. 220,683

2 Claims. (Cl. 211—75)

This invention relates to a storage rack for milk cans and other milking equipment, which may be readily set up in the milk house to receive inverted milk cans, can lids, and milking machine parts if a machine is employed.

The milk can racks previously available have all been constructed, insofar as applicant is aware, with four supporting legs and varied arrangements of milk can and cover receiving rails extending between the supporting legs. The racks could not be solidly placed on an uneven floor, and were quite heavy and cumbersome to ship, even in a knocked-down condition. If they were to be made rigid it was necessary to use diagonal braces at the ends.

The milk can rack of this invention has a pair of end units with supporting rails extending between the end units. Each end unit comprises a single vertical supporting leg, a rearwardly extending upper frame member at the top, a lower frame member which extends across the lower portion of the leg in an upwardly and rearwardly inclined position, and a diagonal frame member secured to the upright leg and having its upper end secured to the rear of the upper frame member and its lower end secured to the front of the lower frame member. Each of the upper frame members is provided with an attaching bracket by which the rack may be secured to a wall of the milk house, or if desired, two racks may be secured together back to back.

The rack of this invention is considerably lighter than any heretofore made, and uses substantially less material. The use of only a single supporting leg at each end of the rack avoids much of the difficulty encountered in attempting to level up a four-legged structure. Even where two racks are secured together back to back, giving essentially a four-legged construction, the wide space between the legs and the semi-independent nature of the two units simplifies leveling as compared with a single four-legged rack.

It will be noted that all the parts are straight rods, pipes, or angle members so that the rack requires little shipping space when knocked down, and that all its parts (except nuts and bolts) may be fabricated with only cutting, stamping, and punching operations. Thus, manufacture and shipping are very inexpensive; and assembly is simple.

The invention is illustrated in a preferred embodiment in the accompanying drawings, in which:

Fig. 1 is a side elevation thereof with a milk can and milk can lid supported thereon shown in broken lines; and Fig. 2 is a fragmentary front elevation thereof.

Referring to the drawings in greater detail, a pair of vertical supporting leg members 3 have rearwardly projecting upper frame members 4 bolted to their tops, at 5, and lower frame members 6 which are bolted near the bottoms of the legs at 7 and extend forwardly and rearwardly of the legs in an upwardly and rearwardly inclined position. A diagonal frame member 8 is bolted at its upper end to the rear end of the frame member 4, and at its lower end to the front of the frame member 6, and is bolted centrally to the supporting leg 3 at 80. Thus each assembly of a leg 3, upper frame member 4, lower frame member 6 and diagonal member 8 forms an end unit for the milk can rack. The resulting end unit requires substantially less material than a two-legged end unit with appropriate cross braces, but is as rigid as the best braced two-legged units. At the rear end of each of the upper frame members 4 an attaching bracket 9 is secured by bolts 9a, so that the rack may be secured to an independent anchor support, such as, for example, the wall 10 of a milk house by means of any suitable fasteners such as lag bolts or wood screws. A washer 9b may be placed between each upper frame member 4 and the wall 10. If two racks are to be fastened together back to back, in which case each provides the independent anchor support for the other, a flat rearwardly projecting strap on one rack may be substituted for the angle bracket, and the other rack may be secured to the projecting end of the strap by a bolt in the position of the bolt 9a; or the ends of the upper frame members and of the lower frame members may be overlapped and bolted together.

Appropriate support rails and bars extend longitudinally between a pair of end units and are bolted to both units to form the complete rack. At the extreme forward ends of the lower frame members 6 is a forward support rail 11 which is bolted to the frame members at 12. A central support rail 13 is bolted to the leg members 3 at 14, and a rear support rail 25 is bolted to the rear ends of the members 6 at 26, the support rails 11, 13, and 25 being parallel to each other, and the distance between each adjacent pair of rails being such that inverted milk cans A and B (shown in broken lines in Fig. 1) may be supported with their necks between the rails. Can A has a handle rested on the central support rail 13 and leans against the rear support rail 25, while can B has a handle rested on the front support rail 11 and leans against the can A. Milk cans vary in construction, and some types of cans will be supported with the rim of the neck resting on the rail 13 or the rail 11.

A pair of supporting rods 15 and 16 are bolted to the diagonal frame members 8 at 17 and 18, respectively. As seen in Fig. 1, these rods are positioned rearwardly of the legs 3, and are so spaced that a milk can cover C (shown in broken lines in Fig. 1) may be supported thereon with its neck between the rods and its flanged shoulder resting on them. If desired, a third rod 19 may be bolted, as at 20, in spaced relation to the rod 16 so that additional milk can covers may be supported thereon in positions alternated with those of the covers on the rods 15 and 16.

Extending between the top frame members 4 is a pair of supporting bars 21 and 22 which are bolted to the frame members 4 by means of bolts 23 and 24, respectively. In order that the spacing of the bars 21 and 22 may be varied to accommodate various articles, the frame members 4 have a series of spaced holes 24a to receive the bolts 23 or 24. The bars 21 and 22 may be so spaced that they support the pail of a long tube floor type milking machine, or a suspended milker in much the same way that a milk can is supported on the rails 11 and 13. The bars also provide convenient hangers for the claw of a long tube milker or for the pail and cover of a suspended milker. By suitable spacing of the bars 21 and 22 they may be adapted to accommodate a variety of equipment.

As previously pointed out, all the parts of the milk can rack are standard metal stock—angles, rods and pipes—which need only be cut to length and punched to receive bolts. Preferably any rod stock is pressed flat at the ends to provide suitable attaching surfaces. Rod stock is most satisfactory for the longitudinal support members 16 and 22, which support relatively little weight. As shown in the drawings, the forward support rail 11 and the central support rail 13 which bear the weight of the milk cans may be pipe stock, for greater strength. It is preferred to use the less expensive rod stock for racks which are designed to accommodate up to six milk cans, while in larger units pipe is substituted for the rod stock, as shown in the drawings.

The foregoing detailed description is given for clearness of understanding only and no unnecessary limitations are to be understood therefrom, as some modifications will be obvious to those skilled in the art.

I claim:

1. A milk can rack adapted to be fastened to an independent upright anchor support, comprising: a pair of spaced end units, each of said units comprising a single upright supporting leg member, an upper frame member projecting rearwardly from said leg member, a lower frame member extending across said leg member in an upwardly and rearwardly inclined direction, and a diagonal frame member secured to said leg member and to the rear of the upper frame member and the front of the lower frame member said leg members being adapted to rest upon a horizontal supporting surface to bear the weight of the rack and its contents; and a plurality of longitudinal members secured at their ends to said end units to afford article supporting means, said longitudinal members including front, central, and rear parallel support rails, at least the front and rear rails being secured to the lower frame members, said rails being positioned so that a first milk can may be partially supported on the central rail and lean against the rear rail, and a second milk can may be partially supported on the front rail and lean against the first milk can.

2. The milk can rack of claim 1 in which the central support rail is secured to the supporting leg members below the lower frame member.

References Cited in the file of this patent

UNITED STATES PATENTS

| Number | Name | Date |
| --- | --- | --- |
| 795,152 | Montgomery | July 18, 1905 |
| 840,696 | Heberling | Jan. 8, 1907 |
| 1,283,326 | Schreck | Oct. 29, 1918 |
| 1,410,740 | Elgin | Mar. 28, 1922 |
| 1,569,358 | Cross | Jan. 12, 1926 |
| 1,623,392 | Davidson | Apr. 5, 1927 |
| 1,879,937 | Kneeland | Sept. 27, 1932 |
| 2,449,628 | Swintosky | Sept. 21, 1948 |

OTHER REFERENCES

1950 Sears Cat., page 1155 (published January 6, 1950). (Copy in Design Div.)